July 10, 1956 B. B. HOLMES 2,753,881
G RESPONSIVE VALVE
Filed Sept. 14, 1951 3 Sheets-Sheet 1

INVENTOR.
BRADFORD B. HOLMES
BY
*Herbert ...*
ATTORNEY

July 10, 1956  B. B. HOLMES  2,753,881
G RESPONSIVE VALVE

Filed Sept. 14, 1951  3 Sheets-Sheet 3

INVENTOR.
BRADFORD B. HOLMES
BY
ATTORNEY

United States Patent Office 2,753,881
Patented July 10, 1956

2,753,881

G RESPONSIVE VALVE

Bradford B. Holmes, New York, N. Y., assignor to Bendix Aviation Corporation, Teterboro, N. J., a corporation of Delaware Application September 14, 1951, Serial No. 246,682

14 Claims. (Cl. 137—38)

This invention relates generally to valve means and more particularly has to do with a control valve adapted for use in an aircraft, or other space vehicles, where it is automatically responsive to certain accelerations to regulate the delivery of fluid pressure to a G-suit.

It is well known that during certain maneuvers of aircraft, or other space vehicles, the acceleration of the aircraft, its components and occupants occasioned by the maneuvers has the the effect of apparently increasing the weight thereof. In the field of aeronautics, the term $g$ has come into wide use to denote this apparent increase in the weight of a body due to an acceleration as aforesaid. Moreover, the term $g$ has been given a numerical value equivalent to that of the acceleration of a mass due to gravity (32.2 feet per second per second) to the end that this apparent increase in the weight of a body may be expressed as varying directly in proportion to $g$. Thus, a body weighing one pound at rest, i. e., at one $g$, will have an apparent weight of two pounds at two $g$'s, while at three $g$'s the weight thereof will apparently increase to three pounds. It is manifest that as the apparent weight of the body varies directly in proportion to variations in the value of $g$, the force exerted by that body on a supporting structure will also vary directly in proportion to $g$. The term $g$ is used in the instant specification within the meaning thereof as above set forth.

It has been found that during certain maneuvers of high speed aircraft, or space vehicles, such as the rapid recovery from a diving attitude, or a sharp, tight turn, the value of $g$ becomes relatively high and the effect thereof on an occupant of the aircraft is to draw, or drain the blood from the brain of the occupant with the result that the occupant becomes dazed or may even lose consciousness. This effect of high $g$ values on the occupant has been called "blacking-out."

To overcome this deleterious effect, it has become the practice to equip the occupants of high speed aircraft with anti-blackout devices, or G-suits, which are designed and constructed to apply pressure to various portions of the body to thereby inhibit the draining of the blood from the occupant's brain.

The pressure utilized for the pressurization of a G-suit has been taken, in some instances, from a constantly running pump or the supercharger turbine outlet and in other instances from containers or tanks of pressurized or compressed fluid. In each instance, however, the fluid pressure at its source is of a relatively high value and, therefore, means have been provided to reduce the pressure prior to its application or use in the G-suit. Moreover, since the G-suit requires pressurization only during maneuvers producing high $g$ values, valve means have been provided to control, or regulate, the fluid pressure delivered to the G-suit to the required value and to vent the pressure therefrom upon a decrease in $g$. Copending application Serial No. 460,007, filed by David Gregg on September 28, 1942, and assigned to Bendix Aviation Corporation discloses a $g$ responsive control valve suitable for automatically regulating the delivery of fluid pressure from a source of fluid pressure such as a pump, or the turbine of a supercharger, to a G-suit. The device shown in the aforenoted Gregg application, however, normally discharges substantially all of the fluid pressure from the source to a point outside of the G-suit except when the device is operative in response to a predetermined value of $g$ to direct a higher fluid pressure into the G-suit. It is manifest, however, that where the source of fluid pressure comprises bottles or tanks of compressed or pressurized fluid, means must be provided to conserve the fluid pressure since the supply thereof is limited.

The instant invention, therefore, contemplates an improved control valve constructed and arranged so as to be automatically operative in response to $g$ to deliver fluid pressure from a source thereof to a G-suit. Moreover, in order to conserve the supply of fluid pressure, the instant valve embodies means whereby the delivery of the fluid pressure is so regulated that fluid pressure is delivered only in response to $g$ above a predetermined value and only in the amount required to off-set the deleterious effect of that $g$ upon the person using the G-suit. Thus, by providing for the delivery of a fluid pressure that varies directly in proportion to variations in the value of $g$ above a predetermined value the novel valve contemplated herein serves to provide the required pressure for the operation of the G-suit as well as to conserve the source or supply of fluid pressure available to inflate or pressurize the G-suit.

It has also been found that the pressure required to be exerted by the G-suit on the person using it varies with different individuals. Thus, some persons require a greater pressurization of the G-suit to off-set "black-out" than others. Therefore, the novel control valve contemplated herein, embodies means whereby the fluid pressure delivered in response to a $g$ of given value may be varied to meet particular requirements of the person using the G-suit.

Furthermore, it is desirable to insure the operativeness of the G-suit prior to flight, therefore, the instant invention contemplates a control valve wherein means are provided for ground-testing the responsiveness and operation of the valve to different values of $g$.

The above and other objects and advantages of the present invention will appear more fully hereinafter from a consideration of the following description taken together with the accompanying drawings wherein one embodiment of the invention is shown by way of example. It is understood, however, that the drawings are for the purposes of illustration only and are not to be construed as defining or limiting the scope of the instant invention.

In the drawings, wherein like reference characters designate like parts throughout the various views.

Figure 1:
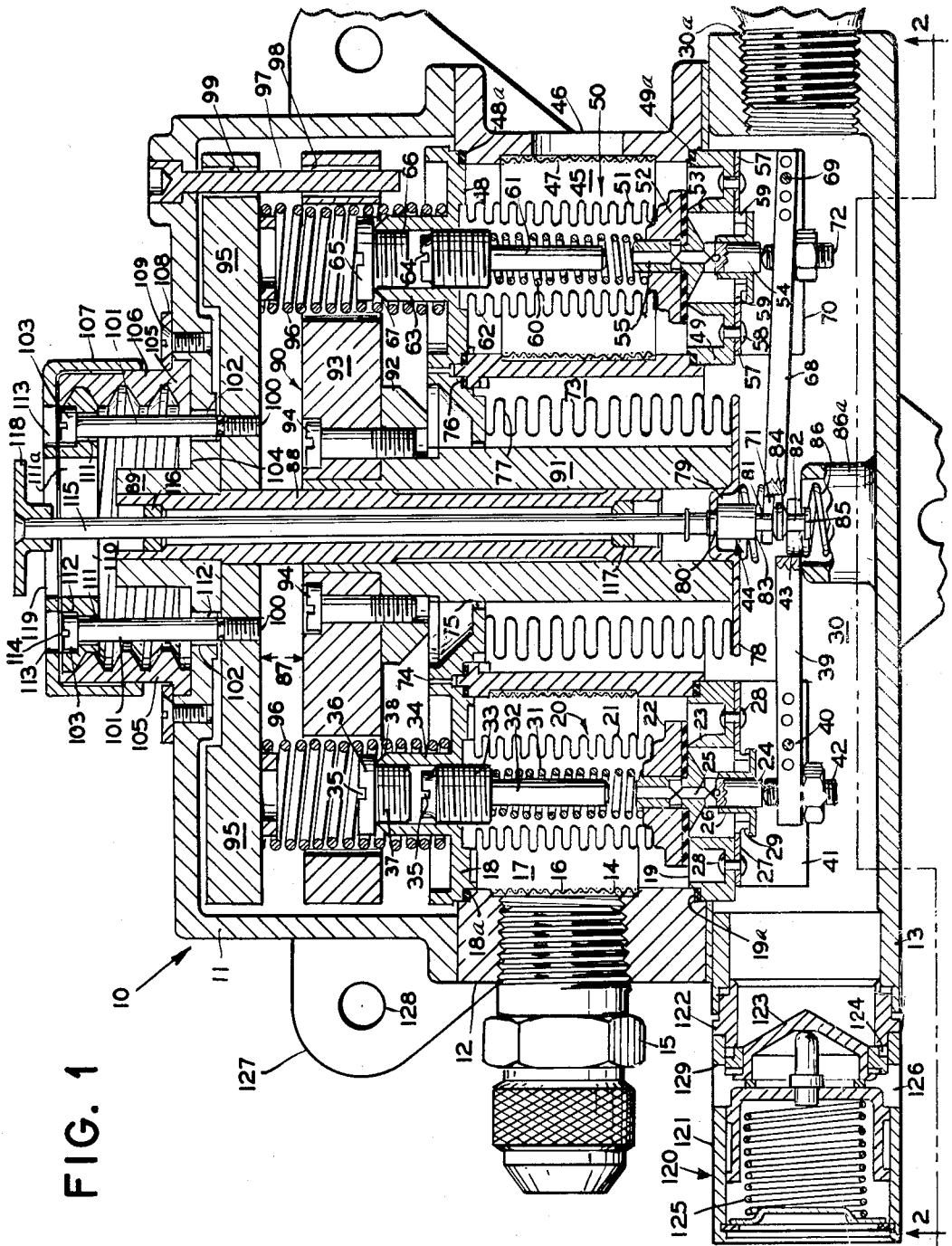
Fig. 1 is a longitudinal section through the novel $g$ responsive valve contemplated herein.

Referring now to the drawings and more particularly to Fig. 1 thereof, the reference character 10 designates a valve casing comprising upper, intermediate and lower sections 11, 12 and 13, respectively, that are secured together by suitable fastening means (not shown) to form the casing 10.

Figure 3:
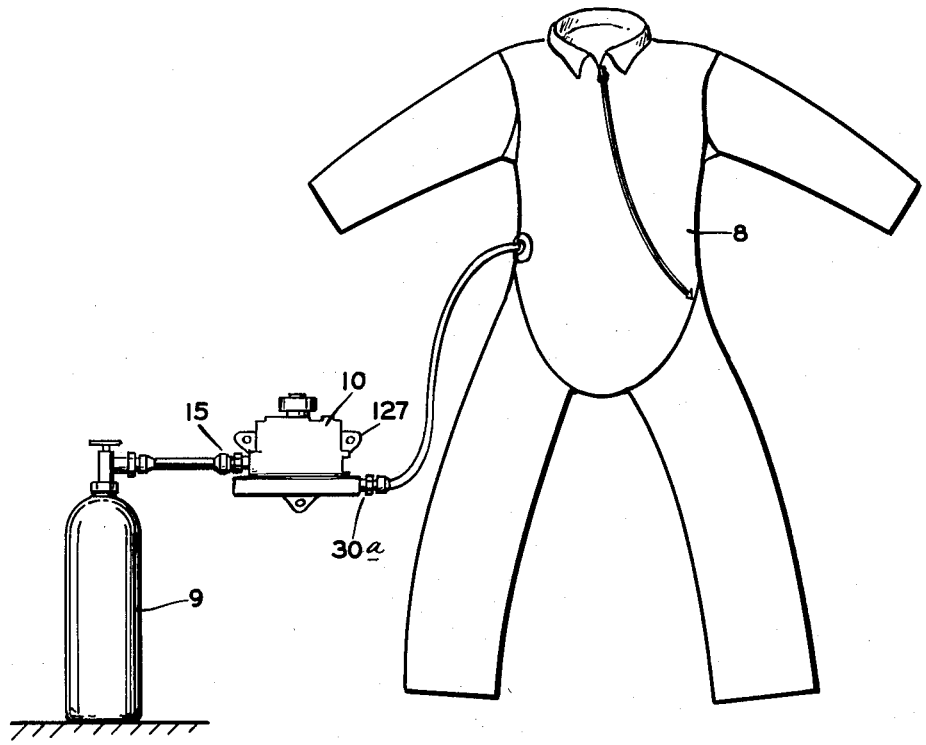
Fig. 3 is a schematic drawing of the instant valve connected to a source of fluid pressure and a G-suit.

Intermediate section 12 is provided at one side thereof, with an inlet 14 adapted to receive a fitting 15 that in turn is connected to a source of fluid pressure 9, as shown in Fig. 3. Inlet 14 communicates through a suitable screen member 16 with an inlet chamber 17 formed in one end of the intermediate section 12. The opposite ends of chamber 17 are provided with upper and lower end plates 18 and 19, respectively, that are secured to section 12 by suitable fastening means (not shown). Suitable gaskets 18a and 19a serve to seal the joint between the end plates 18 and 19, respectively, and section 12. Chamber 17 serves to house an inlet valve assembly 20.

Figure 2:
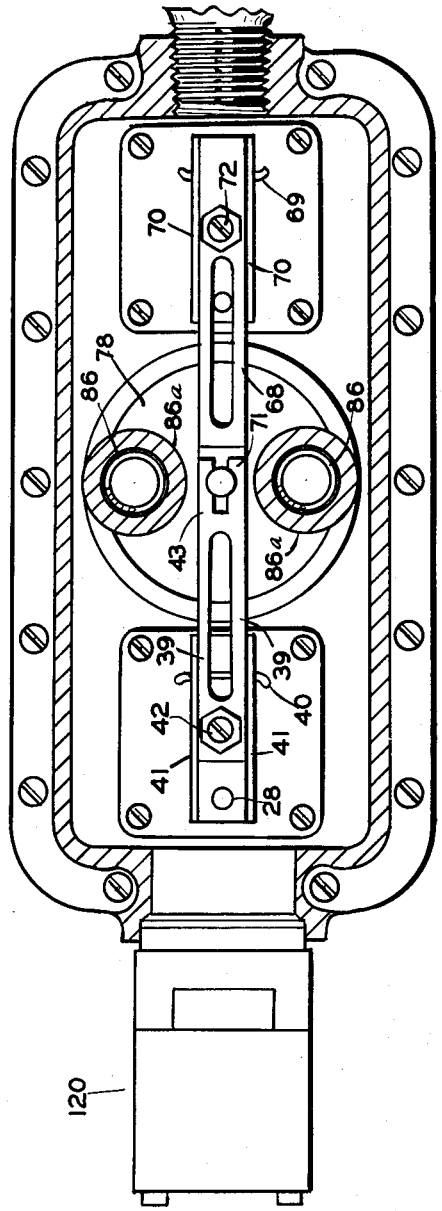
Fig. 2 is a section along line 2—2 of Fig. 1.

Inlet valve assembly 20 is of the balanced type well known in the art and comprises a bellows 21 that is sealingly secured at the upper end thereof to end plate 18, while its lower end is similarly secured to a valve member 22 that is adapted to engage a valve seat 23 formed on lower end plate 19. Valve member 22 is provided with a depending stem portion 24 that extends through valve seat 23, and passageway 25 formed in valve member 22 and the stem portion 24 thereof communicates the downstream side of valve seat 23 with the interior of bellows 21. The area of the orifice in valve seat 23 is the effective area of bellows 21 and as the interior of the bellows communicates to the pressure on the downstream side of the valve, the valve 22 is balanced and is unaffected by inlet and discharge pressure. The lower portion of depending stem 24 is slidably received within a bushing, or guide, 26 carried by a channel member 27 secured to end plate 29 by rivets 28. A plurality of slots, or openings, 29 formed in channel member 27 communicate the downstream side of valve seat 23 to a chamber 30 in the lower section 13 of casing 10. Section 13 is provided with an outlet 30a that is adapted to be connected with a G-suit 8 (Fig. 3) of the type well known in the art and the pressure in chamber 30 is communicated to the G-suit through outlet 30a. Valve member 22 is urged into engagement with valve seat 23 by a spring 31 that is positioned within bellows 21 and operatively positioned between valve member 22 and a calibrating screw 32. Calibrating screw 32 is externally threaded at the upper portion 33 thereof to engage an internally threaded sleeve, or extension, 34 formed on end plate 18. A notch 35 formed on the head of screw 32 affords means for adjusting the force exerted by spring 31 on valve member 22. A cap 36 having an externally threaded stem 37 engaged with the internal threads of the upper portion of sleeve 34 is adapted to engage the lower surface thereof with an annular knife-edge seal 38 formed on the end of sleeve 34 to prevent leakage into or out of the interior of bellows 21. To actuate inlet valve assembly 20, a lever 39 is pivotally mounted on a pin 40 carried by the depending flanges 41 of channel member 27. One end of lever 39 is threaded to receive an adjusting screw 42 that is adapted to engage the bottom, or end, of depending stem 24 of valve member 22. The opposite end of lever 39 is bifurcated as shown in Fig. 2 to form a yoke 43 that engages an actuating member 44. The details of construction of member 44 and the means by which it is actuated so as to pivotally move lever 39 will be hereinafter more fully set forth. For present purposes, it is sufficient to state that a clockwise pivotal movement of lever 39 about pin 40 in response to vertical downward movement of member 44, raises valve member 22 off its coacting seat 23 against the bias of spring 31 to permit fluid pressure to pass from chamber 17 into chamber 30.

Intermediate section 12 is also provided at the opposite side thereof from chamber 17 with a chamber 45 having an outlet 46 that communicates through a suitable screen 47 with the ambient atmosphere. As in the instance of chamber 17, the opposite ends of chamber 45 are provided with upper and lower end plates 48 and 49, respectively, and sealing gaskets 48a and 49a. A vent valve assembly 50, similar in construction to inlet valve assembly 20, is housed within chamber 45.

Valve assembly 50 is of the balanced type generally similar to the inlet valve assembly 20 and comprises a bellows 51 sealingly secured at the upper end thereof to upper end plate 48 while the lower end thereof is similarly secured to a valve member 52. Valve member 52 is adapted to engage a valve seat 53 formed on lower end plate 49 and is provided with a depending stem portion 54 that extends through valve seat 53. A passageway 55 formed in valve member 52 and the stem 54 thereof, communicates the side of valve seat 53 adjacent pressure chamber 30 with the interior of bellows 51. The lower end of stem 54 is slidably mounted within a bushing, or guide, 56 carried by a channel member 57 secured to lower end plate 49 by rivets 58. A plurality of slots, or openings 59 in channel member 57 communicate the pressure chamber 45 through valve seat 53 with chamber 30 formed in the lower section 13 of casing 10.

Valve member 52 is urged into engagement with valve seat 53 by a spring 60 that is positioned within bellows 51 and operatively engaged between valve member 52 and a calibrating screw 61. Calibrating screw 61 is exteriorly threaded at the enlarged upper portion 62 thereof to engage an internally threaded extension 63 formed on end plate 48. The head of screw 61 is notched as at 64 to afford means for rotating screw 61 and thereby adjusting the force exerted by spring 60 on valve member 52. The interior of bellows 51 is sealed by a cap 65 that is provided with an exteriorly threaded stem 66 that engages the threads of sleeve 63. Rotation of cap 65 engages the lower surface of the head thereof with an annular knife-edge seal 67 formed on the end of sleeve 63.

Vent valve assembly 50 is actuated by a lever 68 that is pivotally mounted on a pin 69 carried by depending flanges 70 of channel member 57. One end of lever 68 is bifurcated to form a yoke 71 that engages actuating member 44. Lever 68 is further provided with an adjustable screw 72 that is threadedly received therein and positioned between yoke 71 and pivot pin 69 where it is engageable with the bottom of depending stem 54 of valve member 52. Clockwise movements of lever 68 in response to vertical upward movements of member 44 engage screw 72 with the bottom of stem 54 to raise valve member 52 off its coacting seat and thereby vent chamber 30 to atmosphere through outlet 47.

Intermediate section 12 is further provided with a chamber 73 that is disposed between chambers 17 and 45. An end plate 74 having a central opening 75 formed therein is secured by suitable fastening means, not shown, to section 12 at the upper end of chamber 73, and a sealing gasket 76 is interposed between the peripheral portion of end plate 74 and section 12. The lower end of chamber 73 is open and communicates with chamber 30.

An actuating bellows 77 is operatively positioned in chamber 73 by sealingly securing the upper end thereof to the lower surface of end plate 74 about the opening 75 formed therein. The opposite or lower end of bellows 77 is closed by an end wall in the form of a plate 78 that is provided with a cup-like recessed portion 79 formed in the central portion thereof for guiding purposes.

Actuating member 44 is provided with an upper extension 80 that is sealingly mounted into an opening formed in the center of the recessed portion 79 of plate 78. As hereinbefore set forth, levers 39 and 18 are provided with yokes 43 and 71, respectively, that are adapted to operatively engage with actuating member 44. To that end, actuating member 44 is provided with annular grooves 81 and 82 that define an upper shoulder 83, an intermediate abutment 84 and a lower or end flange 85. Yoke 71 of lever 68 is positioned in groove 81 so as to be operatively engaged by shoulder 83 and abutment 84 while yoke 43 of lever 39 is positioned in groove 82 so as to be operatively engaged by abutment 84 and end flange 85.

For purposes that will hereinafter be more fully set forth, spring 86, adjustably mounted in a housing 86a carried by lower section 13, is operatively engaged with the lower surface of bottom plate 78.

To operatively position a weight assembly 87 in engagement with the bottom plate 78 of bellows 77, the upper end of a hollow guide post 88 is press fitted into a cylindrical extension 89 formed on casing section 11. Guide post 88 extends partially into the interior of bellows 77 where it terminates short of the cup-like recessed portion 79 of bottom plate 78.

Weight assembly 87 comprises primary member or weight 90 which consists of a cylindrical section 91 adapted to be slidably mounted on post 88 and to rest on bottom plate 78, a frusto-conical section 92 formed at the upper end of section 91 and a relatively flat rectangular plate 93 that is adapted to be mounted to the frusto-conical section 92 by screws 94. Weight assembly 87 also includes a secondary member or weight 95 in the form of a relatively flat rectangular plate that is adapted to engage the upper surface of plate 93 of the primary weight 90. Compression springs 96 disposed about sleeves 34 and 63 of end plates 18 and 48, respectively, are engaged between end plates 18 and 48 and the bottom surface of auxiliary member 95. To prevent the rotation of weight assembly 87 about guide post 88, a pin 97 secured to casing 10 is slidably received in openings 98 and 99 formed in the plate 93 of primary weight 90 and auxiliary member 95, respectively.

To afford means whereby secondary member 95 may be moved into and out of operative engagement with the plate 93 of the primary weight 90, a plurality of internally threaded openings 100 formed in secondary weight 95 are adapted to receive the externally threaded lower end portions of support rods 101. Each support rod 101 is reciprocable within an opening 102 formed in casing 10 and is provided at the upper end thereof with an enlarged portion or head 103. Casing 10 is recessed as at 104 to receive the flanged lower portion 105 of a hollow sleeve 106 having a cap 107 affixed thereto and closing the upper end thereof. A ring 108 secured to casing 10 by screws 109 maintains the flange 105 of sleeve 106 within recess 104 but permits the rotary movement of sleeve 106 by cap 107. Sleeve 106 is internally threaded throughout its length to operatively engage an externally threaded spider 110. Spider 110 is provided with a plurality of openings 111 in which support rods 101 are slidably received and a central opening 111a to accommodate cylindrical extension 89. Each opening 111 has an annular shoulder 112 formed therein that is adapted to engage the head 103 of support rod 101.

As shown in Fig. 1, spider 110 is at the upper end of sleeve 106, and therefore, the head 103 of support rods 101 are engaged with shoulders 112 and secondary weight 95 is out of engagement with primary weight 90. By rotating cap 107 and thereby sleeve 106, spider 110 moves downwardly relative to sleeve 106 and extension 89 so that secondary weight 95 compresses springs 96 and engages plate 93 of the primary weight 90. Upon the continued rotation of cap 107 the heads 103 are disengaged from their coacting shoulders 112, thereby permitting a limited vertical reciprocation of support rods 101 within openings 111. To afford means whereby the support rods 101 may be assembled, the cover 107 is provided with a plurality of openings 113 in alignment with the head 103 of rods 101. A suitable tool such as a screw driver may be inserted through opening 113 and engaged with slots 114 formed in the head 103 to rotate the support rods 101 for adjusting the same in screw threaded engagement in openings 100.

To provide means for testing the operation of the valve, a rod 115 is slidably mounted in upper and lower bushings 116 and 117, respectively, that are positioned within guide post 88. The lower end of rod 115 is engageable with the inner surface of bottom plate 78 while the upper end thereof has secured thereto a button 118 that is positioned in a central aperture 119 formed in cap 107. It is apparent that when a force or weight is applied to button 118, it will be transmitted through rod 115 to bottom plate 78 and therefore will be added to the weight of weight assembly 87 already imposed on plate 78.

To prevent excessive pressure in the chamber 30 in the event inlet valve assembly 20 or vent valve assembly 50 should malfunction, a pressure relief valve assembly 120 is mounted to lower section 13 in communication with chamber 30. Relief valve assembly 120 may be of any type well known in the art. As shown in Fig. 1, relief valve 120 comprises a cylindrical body 121 that is secured to an adapter 122 which in turn is mounted to section 13. A valve member 123 is normally biased into engagement with a valve seat 124 by a spring 125. When pressure in chamber 30 exceeds a predetermined maximum, valve member 123 is lifted off its coacting seat 124 and the pressure is vented to ambient atmosphere through suitable openings 126 in body 121.

A mounting plate 127 having suitable openings 128 formed therein is secured to intermediate section 12 by suitable means, not shown, and provides means whereby the valve may be mounted in an aircraft, or other space vehicle with the vertical axis thereof coincident with the vertical axis of the vehicle during flight.

As hereinbefore set forth, the instant control valve is adapted to provide different degrees of pressurization of the G-suit. For purposes of more clearly illustrating the adjustment and operation of the valve to achieve these ends, reference will be made to the low and high settings of the valve.

At the low setting of the valve secondary weight 95 is retracted as shown in Fig. 1 and, therefore, the weights effective on bellows 77 to move it downwardly are primary weight 90, i. e., cylindrical section 91, frusto-conical section 92, plate 93, and screws 94, rod 115, cap 118, actuating member 44 and any weight imposed on actuating member 44 by levers 39 and 68. For purposes of illustration, it will be assumed that when the valve is at rest, i. e., at one g, the total weight of the above elements equals one pound and this weight will hereinafter be referred to as embodied solely in the primary weight 90.

At the high setting of the valve, secondary weight 95 is released by suitable adjustment of the spider 110 by rotating cap 107 so as to cause weight 95 to compress springs 96 to their working height and engage primary weight 90. For purposes of illustration, the secondary weight 95 and its support rods 101 may be assumed to total one half pound. Hereinafter, the combined weights of primary and secondary weights 90 and 95, respectively, as above set forth, will be referred to as weight assembly 87.

With the assumed weights of primary weight 90 at low setting above noted, a bellows 77 having an effective area of one square inch will, at the low setting of the valve, provide an increase in the pressure within the G-suit of one pound per square inch (p. s. i.) which is effected by the bellows 77 in cooperation with the primary 90 in response to each increase of one g above a predetermined value of g. However, at the high setting of the valve, each increase of one g above a predetermined value of g produces an increase in G-suit pressure of one and a half pounds per square inch, which is effected by bellows 77 in cooperation with the several elements of the weight assembly 87 including primary weight 90 and also weight 95 opposed by the springs 96, as hereinafter explained.

To adjust the instant valve at its low setting and to ground-test it prior to the installation thereof into an aircraft, or other space vehicle, valve casing 10 is mounted by plate 127 to a suitable supporting structure and positioned so as to have the vertical axis thereof along stem 115 in agreement with the vertical axis of the aircraft during normal flight. Adjustment screws 42 and 72 are backed off until they are out of contact with their respective valve stems 24 and 54, and cap 107 is rotated to retract secondary weight 95 to the position shown in Fig. 1. Inlet 14 is then connected to the source of fluid pressure 9 (Fig. 3) and outlet 30a to a pressure gauge (not shown). Spring 31 maintains inlet valve assembly 20 in a closed position and, therefore, no fluid pressure enters chamber 30.

It is manifest that a weight imposed on button 118 will be transmitted through rod 115 to plate 78 of bellows 77 where it will be added to the weight of primary weight 90. Thus, by adding predetermined weights to button 118, the operation of the valve in response to predetermined values of g may be simulated.

It is desirable to have the valve operate to deliver fluid pressure to G-suit 8 at some value of g above one g. Therefore, springs 86 are adjusted to exert an upward force on plate 78 of one and a half pounds, At one g, therefore, the forces acting upwardly by virtue of springs 86 exceed the forces acting downwardly through primary weight 90. A weight of one half pound is then placed on button 118 and screws 42 and 72 are adjusted into bearing contact with their respective stems 24 and 54.

Due to the foregoing adjustment, on the removal of the one half pound weight, springs 86 will move plate 78 and actuating member 44 upwardly and slightly compress bellows 77. The upward movement of plate 78 causes lever 39 to pivot in a counterclockwise direction thus removing screw 42 from contact with stem 24 and inlet valve assembly 20 remains closed due to the bias of spring 31. On the other hand, the upward movement of actuating member 44 causes lever 68 to pivot in a clockwise direction about its pivot pin 69 thereby causing screw 72 to raise stem 54 and valve member 52 to permit communication between chamber 30 and the ambient atmosphere. Thus, at values of g below one and a half g, vent valve assembly 50 is open permitting the balancing of the pressure within chamber 30 with ambient atmospheric pressure. Moreover, it is apparent that plate 78 comes to rest at a position where the downward forces balance the upward forces. In the instant position of the valve elements, the downward forces comprise a force of one pound exerted by primary weight 90 and a force of one half pound exerted by lever 68 on abutment 84 due to the compression of spring 60 in opening valve 52 and the compression of bellows 77. The above noted downward forces balance the upward force of one and a half pounds exerted by springs 86.

By placing a weight of one pound on button 118, the total weight acting downwardly on plate 78 may be increased to two pounds thus simulating a condition of two g's. The downward forces acting on plate 78 now exceed the upward forces exerted by springs 86 and plate 78 moves downwardly, thereby pivoting levers 39 and 68 in clockwise and counterclockwise directions, respectively. The counterclockwise movement of lever 68 moves screw 72 away from stem 54 and permits valve member 52 to engage its coacting seat 53 under the bias of spring 60 to close vent valve assembly 50. The clockwise movement of lever 39, however, causes screw 42 to raise stem 24 and member 22 thus permitting fluid pressure to enter chamber 30 from chamber 17. Spring 31 is adjusted to impose a bias, or force, on member 22 sufficient to hold member 22 in sealing contact with coacting seat 23. A force of two-tenths pounds imposed on the bifurcated end 43 of lever 39 operates to overcome the sealing force of spring 31 to a point where member 22 is disengaged from its coacting seat 23 and permits fluid pressure to flow from chamber 17 into chamber 30. Therefore, inlet valve assembly 20 does not open to permit any appreciable flow of fluid pressure between chambers 17 and 30 until a downward force somewhat in excess of one and a half pounds is exerted on plate 78. Under the conditions above set forth, inlet valve assembly 20 opens to permit pressure to build up in chamber 30 at a point when the downward forces slightly exceed one and seven-tenths pounds. Therefore, under simulated conditions of two g's, inlet valve assembly 20 opens at one and seven-tenths g to permit fluid pressure to enter and build up in chamber 30.

As the fluid pressure increases in chamber 30, a pressure differential is produced between the interior of bellows 77, which is in communication with ambient atmospheric pressure through openings 75, 102 and 119, and the exterior of bellows 77 which is exposed to the pressure in chamber 30. The pressure within chamber 30 is in excess of the ambient atmospheric pressure, therefore, the pressure differential is operative on the effective area of bellows 77 to compress the same. As the pressure within chamber 30 increases, the compression of bellows 77 produces an upward force that is added to the upward force imposed on plate 78 by springs 86 and the force of spring 31 reflected back to plate 78 through lever 39 and actuating member 44. When the pressure within chamber 30 reaches one half pound per square inch above ambient atmospheric pressure, the upwardly acting forces balance those acting downwardly. At this point, plate 78 will have been moved upwardly until inlet valve assembly 20 is closed and there will be no further increase in fluid pressure within chamber 30. At this time, plate 78 has assumed a null position due to the balancing of the downward forces by the upward forces. In this instant, a downward force of two pounds exerted by primary weight 90 is balanced by an upward force comprising a pound and a half exerted by springs 86, and a half pound produced by the compression bellows 77 in response to the increased pressure in pressure chamber 30. Therefore, under a simulated condition of two g's, the pressure gauge connected to chamber 30 will read at a desired value of one half pound per square inch.

If the weight on button 118 is increased to two pounds, thus providing a total downward force of three pounds to simulate a condition of three g's, the plate 78 once more moves downwardly opening inlet valve assembly 20. As pressure increases in chamber 30 the pressure differential effective on bellows 77 compresses the same and supplies the necessary balancing force to move plate 78 and lever 39 until the inlet valve assembly 20 is closed by spring 31 as above set forth. At this point, the pressure within chamber 30 and indicated on the pressure gauge is one and a half pounds per square inch. It is manifest that as the weight imposed on button 118 is increased in increments of one pound, the foregoing cycle of operation is repeated and the pressure within chamber 30 increases in increments of one pound per square inch.

From the foregoing description of the operation of the valve during the adjustment and ground-testing of the low setting thereof, it will be apparent to one skilled in the art that when the valve is mounted in an aircraft with its vertical axis coincident with the vertical axis of the aircraft during flight and inlet 14 and outlet 30a are connected to the source of fluid pressure 9 and G-suit 8, respectively, vent valve assembly 50 will remain open, and therefore, the pressure within the G-suit will remain in balance with ambient atmospheric pressure, until the aircraft is maneuvered so as to induce a g in excess of one and a half g's. Thus, during normal ascending or descending flight that does not induce an excessive g, the G-suit pressure remains in balance with ambient atmospheric pressure. If, however, the aircraft is maneuvered so as to induce a high value of g, for example, a tight turn that would induce three g's, the apparent weight of primary weight 90 increases in response to the increased value of g to the end that weight 90 slides downwardly on post 88 thereby increasing the force acting downwardly on plate 78. Plate 78 and actuating member 44 move downwardly against the bias of springs 86 thereby pivoting levers 39 and 68 in clockwise and counterclockwise directions, respectively. As the value of g reaches one and a half g, lever 39 has reached a point where screw 42 is in bearing contact with stem 24. Lever 68, although in bearing contact with stem 54, exerts no upward force thereon. Therefore, both inlet valve assembly 20 and vent valve assembly 50 are held closed by their respective springs 31 and 60. As g reaches a value of one and seven-tenths, screw 42 has compressed spring 31 to a point where member 22 leaves its coacting seat 23 and screw 72 has now moved completely out of contact with stem 54. As g continues to increase, screw 42 raises stem 24 and member 22 is lifted off its seat 23 permitting fluid pressure to end chamber 30 and the G-suit. As hereinbefore set forth, as the fluid pressure enters chamber 30, it produces a pressure differential between interior and exterior of bellows 77 that is operative on the effective area of the bellows 77 to compress the same and thereby produce a force that moves plate 78 upwardly. Thus, under conditions of three g's, when the pressure within chamber 30, and hence the G-suit, reaches a value of one and a half pounds per square inch, the upward force produced thereby in compressing bellows 77 assists the force exerted by springs 86 and the force of spring 31 reflected through lever 39 to move plate 78 upwardly to the null position occupied thereby at a g value of one and a half pounds. Lever 39 is therefore positioned so that screw 42 is engaged with stem 24 and valve member 22 is closed.

Should the value of g remain constant at three g's, the elements of the valve will remain positioned, as above set forth, to maintain a pressure of one and a half pounds per square inch within the G-suit. Upon an increase of g, the cycle of operation hereinbefore described will be repeated and a higher fluid pressure will be delivered to the G-suit. When the g decreases, the pressure differential effective on bellows 77, springs 86, now produce an upward force on plate 78 in excess of the downward force exerted thereon by primary weight 90. It is manifest, therefore, that plate 78 moves upwardly and the consequent pivotal movement of lever 39 in a counterclockwise direction moves screw 42 out of contact with stem 24 and inlet valve assembly 20 is held closed by spring 31. On the clockwise movement of lever 68, screw 72 contacts stem 54 and imposes an upward force thereon to raise member 52 off its coacting seat 53 and vent chamber 30 to atmosphere.

As the fluid pressure within chamber 30 decreases due to the opening of vent valve assembly 50, the upward force contributed by bellows 77 also decreases and bellows 77 begins to distend. Therefore, in the event g is decreased to a value of two g's, vent valve assembly 50 remains open only until the pressure within chamber 30 decreases to one half pound per square inch. At that time, the elements of the valve have once more assumed the position occupied under conditions of one and a half g's and a pressure of one half pound per square inch remains in chamber 30 and the G-suit. Should the value of g decrease to a point below one and five-tenths g's, vent valve assembly 50 remains open until the pressure within chamber 30 and G-suit 8 is brought into balance with ambient atmospheric pressure.

As hereinbefore set forth, the novel valve contemplated herein also embodies means for providing a higher pressure to the G-suit in response to g, and to that end a secondary weight 95 is provided that may be engaged with primary weight 90 to form weight assembly 87.

To adjust the control valve to the high setting thereof whereby it will operate to increase the fluid pressure with the G-suit at the rate of one and a half pounds per square inch per increase of one g above a predetermined value of g, the control valve is first adjusted to the low setting thereof as hereinbefore set forth. Cap 107 is then rotated to move spider 110 downwardly through the entire length of sleeve 106 thereby engaging secondary weight 95 with primary weight 90, freeing rods 101 for a limited vertical reciprocation and compressing springs 96 to their working height. For purposes that will hereinafter become apparent, springs 96 are constructed and arranged to impose an upward force of one half pound on secondary weight 95 when the springs 96 are compressed to their working height. Thus, under a condition of one g, i. e., at rest, secondary weight 95 merely engages, or rests upon primary weight 90 but does not add any weight or force thereto. Moreover, as the apparent weight of secondary weight increases in response to increased values of g, the upward force of springs 96 remaining constant, serves to deduct a force of one half pound from the force produced by the apparent increase in weight of the secondary weight 95. Therefore, at two g's, the apparent weight of secondary member 95 increases to one pound and at three g's increases to one and a half pounds, however, due to the force of springs 96 the secondary weight 95 contributes only one half pound of force to the primary weight 90 at two g's and only one pound at three g's.

At the high setting of the control valve, vent valve assembly 50 closes and inlet valve assembly 20 opens in response to a slightly lower value of g than at the low setting of the valve. However, due to the provision of springs 96, this change in the responsiveness of the valve to g is maintained at a minimum. For example, at the low setting of the valve, inlet valve assembly 20 is adjusted to open at one and seven-tenths g's, i. e., in response to a downward force of one and seven-tenths pounds. Therefore, at the low setting inlet valve assembly 20 starts to open at one and seven-tenths g. At the high setting of the valve, weight assembly 87 in response to one and a half g's, produces a downward force of one and three quarter pounds. This force being comprised of one and a half pounds produced by primary weight 90, and since springs 96 are effective to reduce by one half pound the force exerted by secondary weight 95, the weight of secondary weight 95, although apparently increasing to three quarters of a pound, is effective to contribute only one quarter of a pound to total weight of weight assembly 87. It is apparent, therefore, that although the force required to operate levers 39 and 68 remains the same at both the low and high setting of the valve, at the high setting of the valve, inlet valve assembly 20 and vent valve assembly 50 are operated to open and close, respectively, in response to a slightly lower value of g than at the low setting of the valve.

It will be manifest to one skilled in the art that the instant control valve may be ground-tested at the high setting thereof in a manner similar to its testing at the low setting, the only difference being that a weight of one and a half pounds is required to be added to button 118 to simulate an increase of one g.

It will also be apparent to one skilled in the art that when the instant valve is installed with an aircraft as aforesaid, and adjusted to the high setting thereof, that in response to a maneuver of the aircraft inducing three g's, weight assembly 87 moves plate 78 downwardly under a force of four pounds. As plate 78 moves downwardly under this force and levers 39 and 68 are pivoted thereby, vent valve 50 closes when plate 78 reaches the position it assumes under a downward force of one and a half pounds. When plate 78 reaches the position it assumes under a downward force of one and seven-tenths pounds, inlet valve assembly 20 opens and on the continued movement of plate 78 continues to open to permit fluid pressure to enter and build-up in chamber 30. As pressure builds up in chamber 30 and becomes effective on bellows 77 to compress the same, the downward movement of plate 78 is arrested and plate 78 now moves upwardly until it assumes the position normally occupied thereby under a downward force of one and one half pounds. At this point, lever 39 is positioned to permit member 22 to engage its coacting seat 23 and the flow of fluid pressure into chamber 30 is stopped.

As hereinbefore set forth, when the valve elements are in the position above noted, springs 86 supply an upwardly acting force of one and a half pounds and the force produced by the compression of bellows 77 by the pressure within chamber 30 supplies the additional force required to balance the downward forces. Bellows 77 having an effective area of one square inch, is effective to provide an upwardly acting force of one pound upon an increase of pressure of one pound per square inch within chamber 30. It is manifest, therefore, that at the high setting of the control valve, it will operate to deliver a pressure of two and a half pounds per square inch to chamber 30, and hence G-suit 8, in response to three $g$'s.

From the foregoing, it is also manifest that in response to four $g$'s, weight assembly 87 exerts a downward force of five and a half pounds and the valve, therefore, operates to deliver a pressure of four pounds per square inch to chamber 30 and the G-suit. Thus, in response to an increase of one $g$ the valve operates to increase the pressure within the G-suit by one and a half pounds per square inch.

The operation of the valve at the high setting thereof in response to decreases in the valve of $g$ is similar to its operation at the low setting.

In the foregoing description of the adjustment and operation of the instant valve, certain numerical values have been given to the various elements of the valve. It is to be expressly understood that these values are for purposes of illustration only and are not intended to limit the scope of the instant invention. Moreover, it is understood that various adjustments in the size, weight and arrangement of the various elements of the valve may be made by those skilled in the art without departing from the scope of the instant invention.

From the foregoing description of the construction, arrangement and operation of the novel valve contemplated herein, it will be apparent to one skilled in the art that the various objects of the instant invention have been achieved.

What is claimed is:

1. A control valve for regulating the delivery of fluid pressure from a source of fluid pressure to a G-suit in response to $g$, comprising a casing, an inlet pressure chamber in said casing adapted for connection to the source of fluid pressure, a second pressure chamber in said casing, a normally closed inlet valve assembly in said inlet pressure chamber controlling communication between said inlet pressure chamber and said second pressure chamber, an outlet in said second pressure chamber adapted for connection to the G-suit, a vent chamber in said casing communicating with the exterior thereof, a normally closed vent valve assembly in said vent chamber controlling communication between said vent chamber and said second pressure chamber, a pressure responsive bellows mounted in said second pressure chamber and having an end wall closing one end thereof, a first lever pivotally mounted intermediate its opposite ends in said casing and operatively engaged at one end thereof with said end wall, means carried adjacent the opposite end of said first lever operatively engageable with said inlet valve assembly, a second lever pivotally mounted at one end thereof in said casing, and operatively engageable at the opposite end thereof with said end wall, means carried by said second lever operatively engageable with said vent valve assembly, a weight slidably mounted in said casing and engaged with said end wall, said weight being responsive to $g$ to move said end wall in one direction, spring means engaged with said end wall opposing the movement of said end wall by said weight, and means communicating the interior of said bellows with ambient pressure, said spring means being effective below a predetermined value of $g$ to move said end wall and weight to a position whereby the means carried by said first lever is disengaged from said inlet valve assembly and the means carried by said second lever engages and opens said vent valve assembly, said weight being effective in response to $g$ above said predetermined value to move said end wall against the bias of said spring means to a position whereby the means carried by said first lever operatively engages and opens said inlet valve assembly and the means carried by said second lever is disengaged from said vent valve assembly, and said pressure responsive bellows being effective upon the increase in pressure in said second pressure chamber to move said end wall to a position whereby said means carried by said first and second levers permit said inlet valve and vent valve assemblies to close.

2. A control valve for regulating the delivery of fluid pressure from a source of fluid pressure to a G-suit in response to $g$, comprising a casing, a pressure chamber in said casing having an inlet for connection to the source of fluid pressure, an outlet for connection to the G-suit, and a vent communicating with the atmosphere, inlet valve means controlling the flow of fluid pressure into said pressure chamber, vent valve means controlling flow of fluid pressure between said pressure chamber and the atmosphere, valve actuating means individual to each of said inlet and vent valve means and constructed and arranged to operate either said inlet valve means or said vent valve means, and means operatively engageable with said inlet and vent valve actuating means and responsive to $g$ and the fluid pressure in said pressure chamber to operate either said inlet valve means or said vent valve means to vary in direct relation to $g$ the delivery of fluid pressure to said pressure chamber and G-suit.

3. A control valve for regulating the delivery of fluid pressure from a source of fluid pressure to a G-suit in response to $g$, comprising a casing, a pressure chamber in said casing having an inlet for connection to the source of fluid pressure, an outlet for connection to the G-suit, and a vent communicating with the atmosphere, inlet valve means controlling the flow of fluid pressure through said inlet into said pressure chamber, vent valve means controlling flow through said vent between said pressure chamber and the atmosphere, actuating means mounted in said pressure chamber and including an actuating member, said actuating means being responsive to $g$ and the fluid pressure in said pressure chamber to move said actuating member, and a pair of levers pivotally mounted in said pressure chamber and operatively engaged with said actuating member, one of said levers engageable with said inlet valve means and the other with said vent valve means whereby either said inlet valve means or said vent valve means are actuated in response to $g$ and the fluid pressure in said pressure chamber to regulate the pressure in said pressure chamber and G-suit in direct relation with $g$.

4. A control valve for regulating the delivery of fluid pressure from a source of fluid pressure to a G-suit in response to $g$, comprising a casing, a pressure chamber in said casing having an inlet for connection to the source of fluid pressure, an outlet for connection to the G-suit and a vent communicating with the atmosphere, inlet valve means controlling the flow of fluid pressure through said inlet into said pressure chamber, vent valve means controlling flow through said vent between said pressure chamber and the atmosphere, a fluid pressure responsive means sensitive to the fluid pressure in said pressure chamber, an acceleration responsive means, an actuating member, means operatively connecting said fluid pressure and acceleration responsive means to said actuating member, and a pair of levers pivotally mounted in said pressure chamber and operatively engaged with said actuating member, one of said levers engageable with said inlet valve means and the other with said vent valve means, said levers operable to actuate alternately said inlet and vent valve means in response to $g$ and the fluid pressure in said pressure chamber to thereby regulate the pressure in said pressure chamber and G-suit in direct relation with $g$.

5. A control valve for regulating the delivery of fluid pressure from a source of fluid pressure to a G-suit in response to $g$, comprising a casing, a pressure chamber in said casing having an inlet for connection to the source of fluid pressure, an outlet for connection to the G-suit, and a vent for venting pressure from said pressure chamber to atmosphere, self-closing inlet valve means controlling the flow of fluid pressure into said pressure chamber, self-closing vent valve means controlling the venting of said pressure chamber to atmosphere, a spring biased pressure responsive bellows responsive to fluid pressure in said pressure chamber, an actuating member secured to said bellows, first lever means operatively connected between said actuating member and said inlet valve means, second lever means independent of said first lever means and operatively connected between said actuating member and said vent valve means, said first and second lever means being operative upon movement of said actuating member in one direction to open said vent valve means and to permit said inlet valve means to close, and upon movement of said actuating member in the opposite direction to open said inlet valve means and permit said vent valve means to close, and a g responsive weight engaged with said bellows, said bellows and weight being effective at a first predetermined value of g to move said actuating member in a direction whereby said second lever means opens said vent valve means and said first lever means permits said inlet valve means to close, said weight being effective in response to a second predetermined value of g to move said actuating member whereby said first lever means opens said inlet valve means and said second lever means permits said vent valve means to close, and said bellows being effective on the rise in pressure in said pressure chamber occasioned by the opening of said inlet valve means to move said actuating member to a position whereby said first and second lever means permit said inlet and vent valve means to close.

6. A control valve for regulating the delivery of fluid pressure from a source of fluid pressure to a G-suit in response to g, comprising a casing, a pressure chamber in said casing having an inlet for connection to the source of fluid pressure, an outlet for connection to the G-suit, and a vent communicating with atmosphere, inlet valve means controlling flow of fluid pressure from said inlet into said pressure chamber, resilient means urging said inlet valve means to a closed position, vent valve means controlling communication between said pressure chamber and the atmosphere, resilient means urging said vent valve means to a closed position, a resiliently biased pressure responsive bellows having an end wall, said bellows being responsive to fluid pressure in said pressure chamber to move said end wall, an actuating member secured to said end wall and movable therewith, lever means operatively connecting said actuating member with said inlet and vent valve means, and a g responsive weight operatively engaged with said end wall and responsive to g to move said end wall, said bellows and weight being operative in response to values of g below a predetermined value to move said end wall and actuating member whereby said lever means operates only said vent valve means, and operative in response to values of g above said predetermined value to move said end wall and actuating member to move said lever means to operate only said inlet valve means.

7. A control valve for regulating the delivery of fluid pressure from a source of fluid pressure in a G-suit in response to g, comprising a casing, an inlet chamber in said casing adapted for connection to the source of fluid pressure, a pressure chamber, an inlet valve in said inlet chamber controlling the flow of fluid pressure from said inlet chamber into said pressure chamber, resilient means biasing said inlet valve to a closed position, a vent chamber in said casing communicating with atmosphere, a vent valve in said vent chamber controlling communication between said pressure chamber and vent chamber, resilient means biasing said vent valve to a closed position, an outlet in said pressure chamber communicating with the G-suit, a pressure responsive bellows in said pressure chamber, an end plate closing one end of said bellows, means communicating the interior of said bellows with the atmosphere, said bellows being responsive to a pressure differential between the interior and exterior of said bellows to move said end plate, a weight slidably mounted in said casing and operatively engaged with said end plate, said weight being responsive to g to move said end plate, an actuating member carried by said end plate, and lever means including a first lever having connecting means at one end for connecting said first lever to said actuating member, engaging means at the opposite end thereof for engaging said inlet valve means, and pivot means intermediate said connecting and engaging means, and a second lever having connecting means at one end for connecting said second lever to said actuating member, pivot means at the opposite end thereof, and engaging means intermediate said connecting and pivot means for engaging said vent valve means, said lever means operatively connecting said end plate to said inlet and vent valves whereby said inlet and vent valves are alternately opened by movement of said end plate by said bellows and weight in response to g and the fluid pressure within said pressure chamber.

8. A control valve for regulating the delivery of fluid pressure from a source of fluid pressure to a G-suit in response to g, comprising a casing, a pressure chamber in said casing, self-closing inlet valve means adapted for connection to the source of fluid pressure and controlling flow of fluid pressure into said pressure chamber, self-closing vent valve means communicating said pressure chamber to atmosphere, an outlet from said pressure chamber adapted for connection to the G-suit, resiliently biased pressure responsive means in said casing, g responsive means in said casing engaged with and biasing said resiliently biased pressure responsive means, a first lever, connecting means at one end of said first lever connecting said first lever with said resiliently biased pressure responsive means, engaging means at the opposite end of said first lever engageable with said inlet valve means, a pivot supporting said first lever intermediate said connecting and engaging means, a second lever, connecting means at one end of said second lever connecting said second lever to said resiliently biased pressure responsive means, a pivot supporting the opposite end of said second lever, engaging means on said second lever intermediate said connecting means and pivot engageable with said vent valve means, said lever means being effective in a first position to open said vent valve means and permit said inlet valve means to close, in a second position to permit both said inlet and vent valve means to close, and in a third position to open said inlet valve means and close said vent valve means, said resiliently biased pressure responsive means being effective in response to g below a first predetermined value to move said levers against the bias of said g responsive means to said first position, said g responsive means being effective in response to g above a second predetermined value to move said lever means against the bias of said resiliently biased pressure responsive means to said third position, and said resiliently biased pressure responsive means being effective upon the change of fluid pressure in said pressure chamber to move said lever means against the bias of said g responsive means to said second position.

9. In a g responsive valve adapted to regulate the delivery of fluid pressure to a G-suit, said valve including a g responsive weighted member slidably mounted in said valve and a pressure responsive member coacting with said weighted member to actuate said valve to deliver a predetermined pressure to the G-suit in response to predetermined values of g, the combination of means for increasing the pressure delivered by said valve in response to predetermined values of g comprising a second weighted member slidably mounted in said valve, and means for selectively engaging said second weighted member to the weighted member of said valve.

10. A valve mechanism comprising a casing, a pressure chamber in said casing having a fluid pressure inlet conduit, a fluid pressure outlet conduit and a low pressure vent conduit, valve means controlling at least one of said conduits for controlling the fluid pressure in at least one of said conduits, a first *g* responsive weighted member, a fluid pressure responsive member sensitive to the fluid pressure in said outlet conduit, means operatively connecting said first weighted member and said fluid pressure responsive member to said valve means to effect a predetermined fluid pressure in said outlet conduit in response to predetermined values of *g* effecting said first weighted member, a second weighted member, and operator-operative means for selectively engaging said second weighted member to said first weighted member for changing said predetermined fluid pressure.

11. In a *g* responsive valve adapted to regulate the delivery of fluid pressure to a G-suit, said valve including a *g* responsive member and a pressure responsive member adapted to actuate said valve to deliver a predetermined fluid pressure to the G-suit in response to predetermined values of *g* above a predetermined value, the combination of means for increasing the fluid pressure delivered by said valve in response to predetermined values of *g* above said predetermined value comprising a second *g* responsive member, means for engaging said second *g* responsive member to the *g* responsive member of said valve, and resilient means biasing said second *g* responsive member, whereby said second *g* responsive member becomes effective on the *g* responsive member of said valve only in response to *g* above the predetermined value.

12. A control valve adapted to regulate the delivery of fluid pressure from a source thereof to a G-suit, comprising a casing, a pressure chamber in said casing, valve means controlling the flow of fluid pressure from the source thereof into and out of said pressure chamber, an outlet from said pressure chamber adapted for connection to the G-suit, actuating means including a pressure responsive member and a first *g* responsive member, said actuating means adapted for operative engagement with said valve means to operate said valve means in response to predetermined values of *g* and fluid pressure in said pressure chamber to deliver a first predetermined fluid pressure to the G-suit, and means including a second *g* responsive member selectively engageable with said first *g* responsive member, said second *g* responsive member operative upon engagement with said first *g* responsive member to operate said actuating means and valve means so as to deliver a second predetermined fluid pressure to the G-suit.

13. A valve mechanism for controlling the delivery of fluid pressure from a source of fluid pressure to a G-suit in response to *g*, comprising a casing, a pressure chamber in said casing having a fluid pressure inlet for connection to said source of fluid pressure, a fluid pressure outlet for connection to the G-suit, and a low pressure vent, inlet valve means controlling the flow of fluid pressure into said pressure chamber, vent valve means controlling flow of fluid pressure between said pressure chamber and the low pressure vent, fluid pressure responsive means sensitive to the fluid pressure in said pressure chamber, acceleration responsive means, and valve actuating means individual to each of said inlet and vent valve means and constructed and arranged to operate either said inlet valve means or said vent valve means, and means operatively connecting said acceleration and fluid pressure responsive means to said valve actuating means to effect operation of said inlet and vent valve means in response to both the fluid pressure in said pressure chamber and to *g* so as to vary in direct relation to *g* the fluid pressure in said outlet and thereby the fluid pressure to said G-suit.

14. A valve mechanism for controlling the delivery of fluid pressure from a source of fluid pressure to a G-suit in response to *g*, comprising a casing, a pressure chamber in said casing having a fluid pressure inlet for connection to said source of fluid pressure, a fluid pressure outlet for connection to the G-suit, and a low pressure vent, inlet valve means controlling the flow of fluid pressure into said pressure chamber, vent valve means controlling flow of fluid pressure between said pressure chamber and the low pressure vent, fluid pressure responsive means sensitive to the fluid pressure in said pressure chamber, acceleration responsive means engaged with said fluid pressure responsive means, and valve actuating means operatively connecting said acceleration responsive means and said pressure responsive means to said inlet and vent valve means to effect operation of said inlet and vent valve means in response to both the fluid pressure in said pressure chamber acting on said pressure responsive means and to *g* forces acting on said acceleration responsive means, said valve actuating means constructed and arranged to alternately operate said inlet and vent valve means to effect in said outlet and G-suit a fluid pressure which varies in direct relation to *g* under predetermined accelerational conditions.

References Cited in the file of this patent

UNITED STATES PATENTS

| | | |
|---|---|---|
| 2,216,854 | Sanford | Oct. 8, 1940 |
| 2,499,793 | Stearns | Mar. 7, 1950 |

FOREIGN PATENTS

| | | |
|---|---|---|
| 604,304 | Great Britain | July 1, 1948 |